Dec. 20, 1966   F. FRITSCH   3,292,460
EPICYCLIC GEAR UNIT
Filed June 26, 1964   3 Sheets-Sheet 2
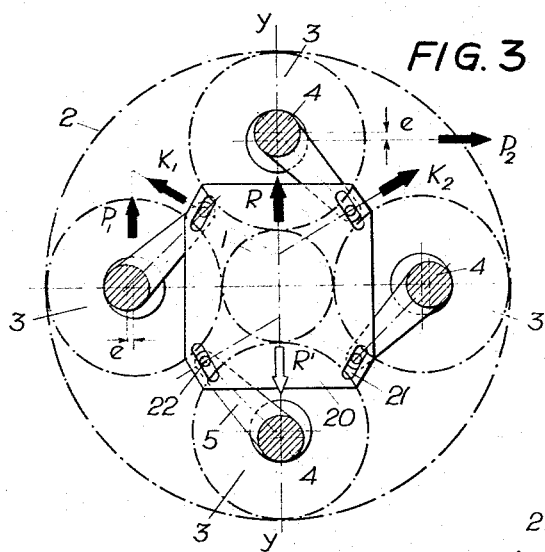
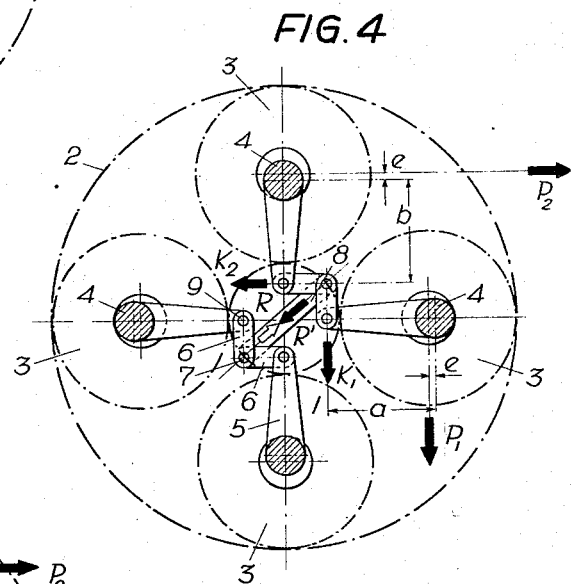
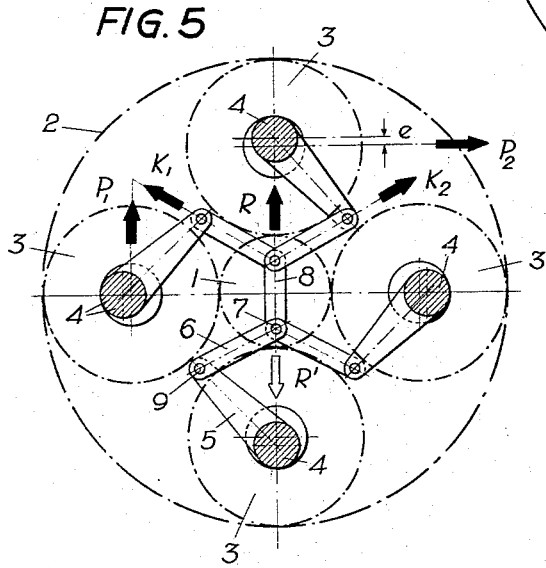
INVENTOR.
FELIX FRITSCH
BY
*Imirie & Smiley*
ATTORNEYS Dec. 20, 1966  F. FRITSCH  3,292,460
EPICYCLIC GEAR UNIT
Filed June 26, 1964  3 Sheets-Sheet 3
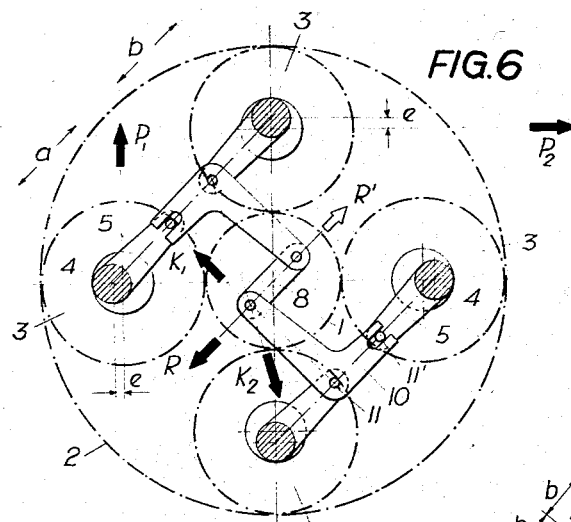
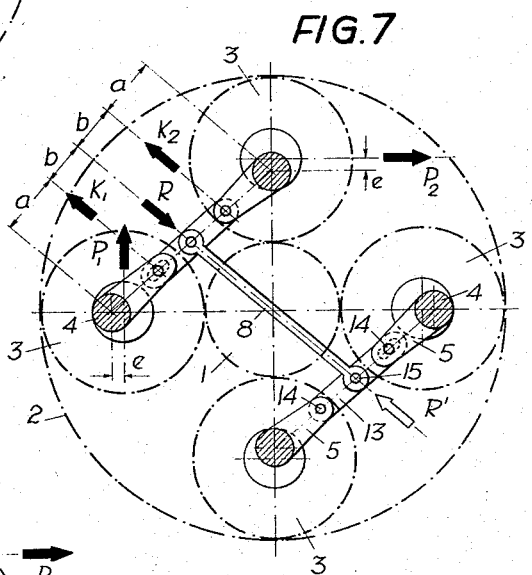
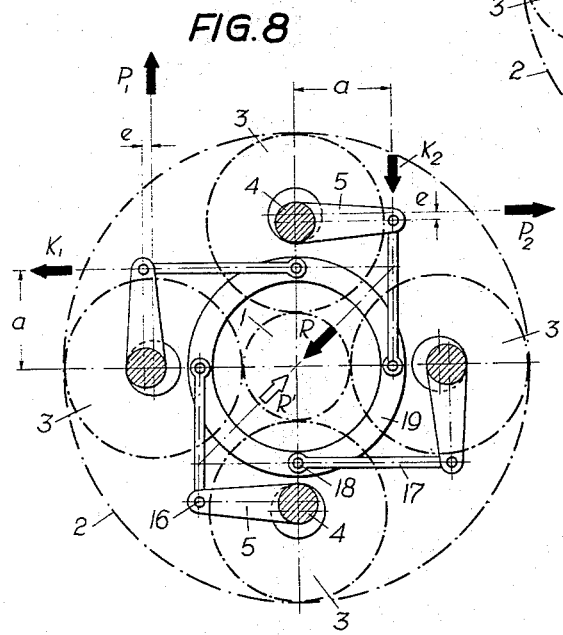
INVENTOR.
FELIX FRITSCH
BY
*Imirie & Smiley*
ATTORNEYS United States Patent Office 3,292,460
Patented Dec. 20, 1966

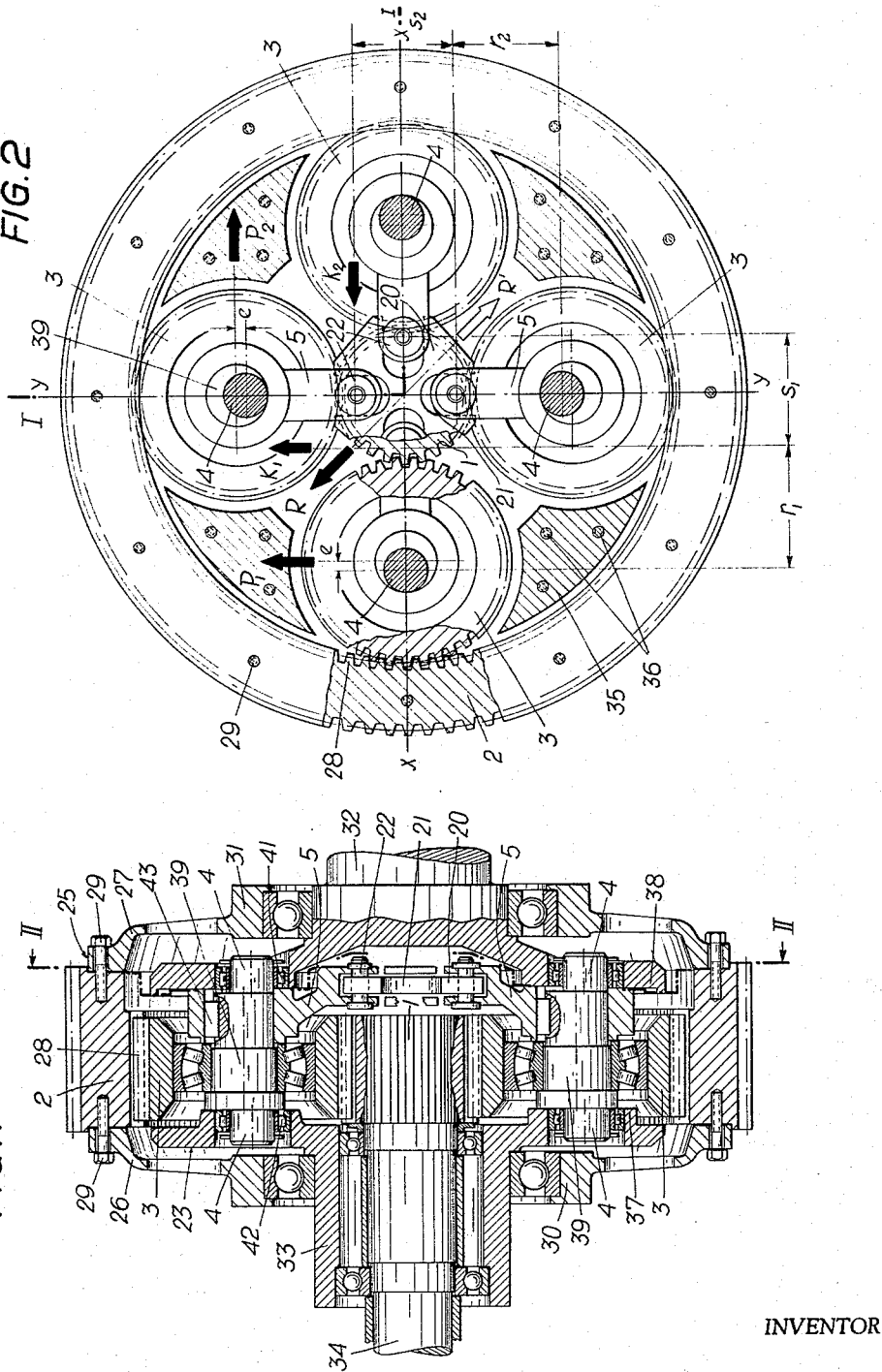

3,292,460
EPICYCLIC GEAR UNIT
Felix Fritsch, Vienna, Austria, assignor to Simering-Graz-Pauker Aktiengesellschaft fur Maschinen-Kessel-und Waggonbau, Vienna, Austria
Filed June 26, 1964, Ser. No. 378,350
Claims priority, application Austria, Oct. 31, 1963,
A 8,725/63
8 Claims. (Cl. 74—801)

This invention relates to an epicyclic gear unit, which comprises four planet wheels, which are mounted on eccentric pins, which are rotatably mounted in the planet wheel carrier and carry interconnected levers.

In the known epicyclic gear units of this type, the levers which extend from the eccentric pins are directly interconnected by rigid bars, which form a parallelogram. This design is unsatisfactory even in theory, and for geometric reasons is unable to provide for the desired balancing of the tooth pressures of all four planet wheels because in this design the rotation of a single one of the four eccentric pins determines the position of the three other pins.

It is an object of the invention to provide on epicyclic gear train which comprises four planet wheels and which enables a perfect balance of the tooth pressures of all four planet wheels, as well as a compensation of inaccuracies due to the manufacture. For this reason the gear unit comprises according to an important feature of the invention a sun wheel, four planet wheels arranged around said sun wheel and in mesh with it, a hollow wheel surrounding said planet wheels and in mesh with them, a planet wheel carrier, eccentric pins mounting the planet wheel and freely rotatably mounted in said planet wheel carrier, each of said eccentric pins being connected to one end of a lever, means operatively coupling the free ends of the levers, the position of the pivot of each of said levers relative to the axis of rotation of the associated planet wheel and the relative position of the levers being such that each of said levers produces two reaction forces, which are symmetric with respect to a plane which contains the gear unit axis, said means operatively coupling the free ends of the levers being arranged to take up said reaction forces and having connecting parts, each of which connects at least two of said levers to each other, said connecting parts being subjected to equal and opposite forces through the gear unit axis, and a closing element, which is freely movable in a plane which is at right angles to the gear unit axis, said closing element interconnecting the connecting parts associated with said levers.

Another feature of the invention resides in that the eccentric levers are substantially radially inwardly directed and the axes of rotation of the eccentric pins lie alternately inside and outside the axes of rotation of the planet wheels.

Finally, it is a feature of the invention that the eccentric levers are substantially radially inwardly directed, the axes of rotation of the eccentric levers lie alternately inside and radially outside of the axes of rotation of the planet wheels, with respect to the gear unit axis, the closing element consists of a disc, and pairs of slots which are parallel and substantially at right angles and bolts engaging these slots are provided for connecting the eccentric levers and the closing element, one of these two connecting parts being provided in the disc and the other in the bolts.

Several embodiments of the gear unit according to the invention are shown on the drawing. FIG. 1 is a sectional view taken on line I—I of FIG. 2 and showing an embodiment of the epicyclic gear unit in which the closing element consists of a slotted disc and the eccentric levers are radially arranged. FIG. 2 is a transverse sectional view taken on line II—II in FIG. 1. The other figures are diagrammatic showings, in which the sun wheel, the planet wheels, the hollow wheel and the housing parts have the same form as the parts shown in FIGS. 1 and 2. They show in FIG. 3 an embodiment in which the closing element consists of a slotted disc and the eccentric levers are arranged with central symmetry. FIGS. 4 and 5 show gear units in which the eccentric levers extend radially inwardly toward the next eccentric pin and the closing element consists of a rigid rod. FIGS. 6 and 7 show embodiments in which the eccentric levers are arranged in pairs of levers directed toward each other and the closing element consists also of a rigid rod, which is stressed in tension and compression. FIG. 8 shows an embodiment in which the eccentric levers extend tangentially and the closing element consists of a ring.

Common to all seven embodiments which are shown is the design including a sun wheel 1, a hollow wheel 2, the four planet wheels 3, which rotate on eccentric pins 4 mounted on a planet wheel carrier 23, and the eccentric levers 5 fixed to the eccentric pins.

The epicyclic gear unit is accommodated in a housing 25, which consists of the two end cover parts 26, 27 and the cylindrical shell part, which is secured to the end cover parts, forms the hollow wheel 2 and is provided with an internal gear ring 28. The parts 26, 27, 2 are suitably connected by screws 29. The planet wheel carrier 23 is mounted in the hubs 30 and 31 of the end cover parts 26 and 27 and is connected at the output end to an output shaft 32 mounted in the hub 31. At the input end, the planet wheel carrier 23 has a hollow hub 33, which is mounted in the hub 30 and serves for receiving the input shaft 34.

The planet wheel carrier 23 comprises two spaced apart, opposite cheeks 37, 38, which are interconnected by lugs 35 and screws 36. The planet wheels 3 are arranged between these cheeks with a regular angular spacing of 90°. The planet wheels 3 mesh with the gear ring 28 of the hollow wheel 2 and with the sun wheel 1, which is disposed at the center of the gear unit and connected to the input shaft 34.

Each of the planet wheels 3 is mounted on a shaft 39, the eccentric pins 4 of which are mounted by needle bearings 41 and 42 in the cheeks 38 and 37. One end of each lever 5 provides an eye bearing, which is slidably fitted on one of the shafts 39 and coupled to it for joint rotation, e.g., by means of a wedge 43.

In the embodiment shown in FIGS. 1 and 2, all four eccentric levers 5 are substantially radially inwardly directed and the axes of rotation of the eccentric pins 4 lie alternately radially outside and inside the axes of rotation of the planet wheels. Bolts 22 are secured to the free ends of the four eccentric levers 5. Each of the bolts 22 engaged a radial slot 21 of a common disc 20, which serves as a closing element for operatively connecting all levers. Each of the bolts 22 is longitudinally displaceable in the slot.

All eccentric pins 4 have the same eccentricity $e$. $r_1$ is the effective length of the eccentric levers mounted on eccentric pins having an axis of rotation outside the axis of rotation of the associated planet wheel. $r_2$ is the effective length of the two other eccentric levers having eccentric pins with an axis of rotation disposed radially inside the axis of rotation of the planet wheel rotatable on them.

The function of the balancing system is apparent from the forces indicated in FIG. 1 for one half of the gear unit. $P_1$ and $P_2$ are the forces transmitted by the planet wheels on their axes. Owing to the eccentricity $e$ of the planet wheel axes, supporting forces $K_1$ and $K_2$ are required at the levers 5 of the eccentric pins 4. Because the axes of rotation of the eccentric pins lie alternately radially outside and inside the axes of rotation of the planet wheels, two interconnected eccentric levers always tend to rotate in mutually opposite senses.

The equilibrium condition on the disc 20 may be expressed as follows:

$$\frac{P_1 e s_1}{r_1} = \frac{P_2 e s_2}{r_2}$$

It is also necessary that $K_1 = K_3$ and, consequently, $P_1 = P_3$ and $P_2 = P_4$.

R is the resultant of the forces $K_1$ and $K_2$ and is also obtained as $R'$ in the second half of the gear unit.

If $$\frac{s_1}{r_1} = \frac{s_2}{r_2}$$

then $$P_1 = P_2 = P_3 = P_4$$

as was desired.

For greater clearness, the forces $K_3$, $K_4$, and $P_3$, $P_4$ are not shown on the drawing.

In the embodiment shown in FIG. 3, the axes of rotation of all eccentric pins 4 are outside the axes of rotation of the planet wheels 3 and the eccentric levers 5 are arranged with central symmetry with respect to the gear unit axis. The closing element consists of a disc 20, which has four slots 21, which are parallel in pairs. The lines of action of forces K have no point of intersection which is common for all lines of action.

According to FIGS. 1 and 2, the eccentricities are not in the same sense whereas the lever directions and connecting elements are similar. In FIG. 3, the eccentricities and the connecting elements are similar and the directions of the levers are mutually opposed. It is essential for the function that the directions do not all have the same sense or opposite senses. Another functional requirement is that the forces K do not have a common intersection for all four forces. These two requirements are met by all systems.

The mechanical action of the balancing system may be described best, e.g., with reference to FIG. 3. When a torque occurs in the gear unit and loads the planet wheel pins in direction of the forces P, and when it is assumed that the planet wheel shown on top is the first to contact with its tooth faces the sun wheel and the hollow wheel, a force $P_2$ will result in a reaction force $K_2$ acting on the disc 20. The force $K_2$ will displace the disc to the left to rotate the eccentric pin shown at the bottom so that the planet wheel of this pin also engages the sun wheel and hollow wheel. The pair of forces $K_2$ now acting with the left-hand moment $K_2 s_2$ rotates the disc 20 in the counterclockwise sense and causes an engagement with one of the wheels carried by the other pins. The resulting force $K_1$ will then displace the disc 20 in the direction y—y until the fourth planet wheel contacts the sun wheel and hollow wheel and can produce the opposing force $K_1$. Only now, when all four planet wheels are transmitting force, can the gear unit transmit the full torque which is due to the forces P. In view of the equilibrium conditions, all forces P are equal.

In the embodiment shown in FIG. 1, all four eccentric levers 5 are radially inwardly directed and the axes of rotation of the eccentric pins 4 lie alternately radially outside and inside the axes of rotation of the planet wheels. Pairs of adjacent eccentric pins are connected by two links 6, which form together a toggle joint. The hinge between the two links 6 is designated 7. 9 is the hinge between the eccentric lever and the pin. The hinges 7 are are interconnected by a rod 8, which forms the closing element. This rod is entirely freely movable in a plane which is at right angles to the axis of the epicyclic gear unit and is held only by the two hinges 7.

The eccentricity $e$ of all eccentric pins 4 is equal. $a$ is the effective length of the eccentric levers mounted on eccentric pins having an axis of rotation outside the axis of rotation of the associated planet wheel. $b$ is the effective length of the two other eccentric levers, the eccentric pins of which have an axis of rotation which is radially inside the axis of rotation of the planet wheel rotatable on them.

$P_1$ and $P_2$, $K_1$ and $K_2$ and R and R' are entered as in the other figures.

Hence, the following equations may be written:

$$K_1 = \frac{P_1 e}{a}$$

$$K_2 = \frac{P_2 e}{b}$$

R is the resultant from the forces $K_1$ and $K_2$ and is obtained with the same magnitude (R') in the second half of the gear unit. $a$ and $b$ may be selected so that $P_1 = P_2$ and, consequently, $P_3 = P_4$.

The embodiment of the gear unit shown in FIG. 5 differs from that of FIG. 4 inasmuch as the eccentric levers 5 have such a position that each of them is directed toward the next eccentric pin. Besides, the axes of rotation of all eccentric pins are arranged on the same side—radially outside in the example shown—of the axes of rotation of the planet wheels. This arrangement and the described position of the eccentric levers 5 results also in the generation of diverging forces K when the planet wheels are loaded. Geometrically the relations are the same as those explained with reference to FIGS. 1 to 4.

In the embodiment shown in FIG. 6, the four eccentric levers 5 are arranged in pairs of oppositely directed levers, which engage the ends of one arm of a bell-crank lever 10. One of the two hinges 11, 11' serving to connect the eccentric lever and the bell-crank lever arm is provided with an elongated hole 24, which serves for compensating the change in length during the pivotal movement of the eccentric levers. The axes of rotation of the eccentric pins lie radially outside the axes of rotation of the planet wheels 3. A load on the planet wheel will then cause a loading which tends to rotate the two bell-crank levers 10 in opposite senses. The other arms of the bell-crank levers are directed toward the interior of the gear unit and interconnected by the rod 8, which forms the closing element.

It is easy to recognized that the two forces $P_1$ and $P_2$ acting on the planet wheels of one half of the gear unit generate the forces $K_1$ and $K_2$ at the hinges 11, 11' and give the resultant R at the hinges 12 to which the rod 8 is connected, which forms the closing element. The resultant R must again equal the resultant R', which is due to the load on the two other planet wheels.

A further simplification is possible in this embodiment. The two bell-crank levers 10 may be T-shaped and directed toward each other. The bar 8 forming the closing element may be replaced by a bolt, which is disposed in the inwardly directed arm of one lever 10 and which engages a longitudinal slot of the inwardly directed arm of the other lever 10.

In the embodiment shown in FIG. 6, the eccentric levers 5 have the same effective length $a = b$.

The embodiment shown in FIG. 7, which is a modification of the design shown in FIG. 6, comprises also pairs of oppositely directed eccentric levers. However, the axes of rotation of the eccentric pins 4 lie alternately radially inside and outside the axes of rotation of the planet wheels 3. The ends of the oppositely directed eccentric levers 5 are connected by balance beams 13, which are pivoted by the hinges 14, 14' to the ends of the eccentric levers 5. One of the hinges 14, 14' (in the present case the hinge 14') is provided with an elongated hole 24', which serves for compensating the length changes during the pivotal movement of the eccentric levers.

The ends of the rod 8 forming the closing element are connected by the hinges 15 to the center of the balance beams 13.

The force relations are easily apparent from the forces $P_1$, $P_2$ and $K_1$, $K_2$ shown for two planet wheels 3, the resultants R, R', as well as the effective lengths $a$, $b$ of the eccentric levers and of the strap halves. It is apparent from the axes of rotation of the eccentric pins that a load on the planet wheels tends to move the eccentric levers in the opposite sense and to displace the balance beams 13 transversely, possibly with a slight rotation, so that the rod 8 forming the closing element 8 is stressed in compression or tension.

The gear unit shown in FIG. 8 shows a central-symmetrical arrangement of the eccentric levers. For a clear showing, the eccentric levers are represented in an arrangement in which each lever is tangential to a circle which is concentric to the gear unit axis and extends through the axis of rotation of the lever. The axes of rotation of the eccentric pins lie alternately radially inside and outside the axes of rotation of the planet wheels 3.

Each eccentric lever has connected to its end by a hinge 16 a connecting rod 17. In this embodiment, the connecting rods are substantially at right angles to the eccentric levers 5. Alternatively, they may assume a different position relative to the eccentric levers. At their other ends, the connecting rods are connected by the hinges 18 to a ring 19, which forms the closing element. It is important that their center lines do not have a common point of intersection so that the rods 17 lie on the sides of a quadrangle.

Just as in the embodiments described hereinbefore, the forces $P_1$, $P_2$, $K_1$, $K_2$, R, R', the eccentricity $e$ and the effective lengths $a$ of the eccentric levers, which may all have the same length in this case, are shown in the drawing. Because the axes of rotation of the eccentric pins lie alternately inside and outside the planet wheel axes, a load on the planet wheels associated with two adjacent eccentric levers causes the latter to displace the ring 19 in its plane in the direction of the resultant R (or R') shown on the drawing.

If the gear unit has been manufactured with sufficient accuracy, i.e., if the balancing systems do not move too far from their zero position, the load balance afforded by all systems which have been shown is virtually perfect provided that the defects due to friction are disregarded.

Dynamic stresses may have undesirable effects at higher speeds. To suppress such stresses, it is proposed to provide the various hinges, such as 7, 9; 11, 12; 14, 15; 16, 18; possibly also 22, of the balancing system with resiliently deformable bushings or the like, by which any shocklike force peaks are resiliently taken up with damping so that these forces are not transmitted in their full magnitude through the balancing system. The incorporation of resilient elements at these points is suitable and permissible because the forces transmitted there are only a small fraction of the forces transmitted at the planet wheel pins so that the forces at the bushings can easily be controlled even in the case of high powers. Besides, the resilient deformations have under a purely static load no influence at all on the accuracy of the force balance.

These examples do not exhaust the designs in which the invention may be embodied. Only by way of example it may be mentioned that in FIG. 5 the links 6 and the rod 8 forming the closing element may be replaced by a slotted disc, just as is shown in FIG. 3 with respect to FIG. 4. In FIG. 8, the levers 5 might be pivotally moved through 180° at two opposite eccentric pins 4 to obtain a balancing system similar to that of FIG. 4, but with tangentially disposed eccentric levers. In FIG. 3, the bolts 22 might be fixed in the disc 20 rather than in the levers 5 and the lever 5 might be provided with corresponding longitudinal slots. The ring 19 may be replaced by a disc, a plate, a cruciform plate, etc.

The above examples showing how the invention can be embodied in designs other than those shown in the drawings do not exhaust the invention.

What is claimed is:

1. An epicyclic gear unit, comprising a sun wheel, four planet wheels arranged around said sun wheel and in mesh with it, a hollow wheel surrounding said planet wheels and in mesh with them, a planet wheel carrier, eccentric pins mounting the planet wheel and freely rotatably mounted in said planet wheel carrier, each of said eccentric pins being connected to one end of a lever, means operatively coupling the free ends of the levers, the axes of said eccentric pins being alternately inside and outside the axes of rotation of the respective planet wheels, said means operatively coupling the free ends of the levers being arranged to take up said reaction forces and having connecting parts, each of which connects at least two of said levers to each other, said connecting parts being subjected to equal and opposite forces through the gear unit axis, and a closing element, which is freely movable in a plane which is at right angles to the gear unit axis, said closing element interconnecting the connecting parts associated with said lever, said eccentric levers being substantially radially inwardly directed and the axes of rotation of the eccentric pins lying alternately inside and outside the axes of rotation of the planet wheels.

2. An epicyclic gear unit as set forth in claim 5, characterized in that the closing element consists of a disc, which interconnects the ends of all levers, the connection being established by a slot in one of the parts to be connected and a bolt in the other part, the bolt being slidable in the slot in the longitudinal direction of the latter.

3. An epicyclic gear unit, comprising a sun wheel, four planets wheels arranged around said sun wheel and in mesh with it, a hollow wheel surrounding said planet wheels and in mesh with them, a planet wheel carrier, eccentric pins mounting the planet wheel and freely rotatably mounted in said planet wheel carrier, each of said eccentric pins being connected to one end of a lever, means operatively coupling the free ends of the levers, the axes of said eccentric pins being alternately inside and outside the axes of rotation of the respective planet wheels, said means operatively coupling the free ends of the levers being arranged to take up said reaction forces and having connecting parts, each of which connects at least two of said levers to each other, said connecting parts being subjected to equal and opposite forces through the gear unit axis, and a closing element, which is freely movable in a plane which is at right angles to the gear unit axis, said closing element interconnecting the connecting parts associated with said lever, said eccentric levers being substantially radially inwardly directed, the axes of rotation of the eccentric levers lying alternately inside and radially outside of the axes of rotation of the planet wheels, with respect to the gear unit axis, the closing element consisting of a disc, and pairs of slots which are parallel and substantially at right angles and bolts engaging these slots for connecting the eccentric levers and the closing element, one of these two connecting parts being provided in the disc and the other in the bolts.

4. An epicyclic gear unit as set forth in claim 3, characterized in that said slots extend substantially radially.

5. An epicyclic gear unit, comprising a sun wheel, four planet wheels arranged around said sun wheel and in mesh with them, a planet wheel carrier, eccentric pins mounting the planet wheel and freely rotatably mounted in said planet wheel carrier, the axes of said eccentric pins being alternately inside and outside the axes of rotation of the respective planet wheels, each of said eccentric pins being connected to one end of a lever, means operatively coupling the ends of the adjacent levers producing a reacting force being opposite to that one of the other levers, said means being arranged to take up said reaction forces and having connecting parts, each of which connects at least two of said levers to each other, said connecting parts being subjected to equal and opposite forces through the gear unit axis, and a closing element, which is freely movable in a plane which is at right angles to the gear unit axis, said closing element interconnecting the connecting parts associated with said levers.

6. In an epicyclic gear unit, in combination, a sun wheel, a planet wheel carrier, four planet wheels arranged around said sun wheel and in mesh therewith, an eccentric pin rotatably mounting each planet wheel on said carrier, the axes of rotation of the eccentric pins lying inside the axes of rotation of their respective planet wheels whereby, under load, the planet wheels will alternately align themselves in relatively opposite rotational senses about the axes of said eccentric pins, a lever fixed to each eccentric pin, and last motion means interconnecting said levers.

7. In the gear unit according to claim 6 wherein said last motion means comprises a disc having slots therein slidably receiving the free ends of said lever.

8. In the gear unit according to claim 6 wherein said lost motion means includes link members pivotally interconnecting pairs of said levers.

References Cited by the Examiner

UNITED STATES PATENTS

| 1,586,309 | 5/1926 | Hult | 74—801 |
| 3,080,775 | 3/1963 | Fritsch | 74—410 X |

FOREIGN PATENTS 237,465   9/1945   Switzerland.

DAVID J. WILLIAMOWSKY, *Primary Examiner.*

J. R. BENEFIEL, *Assistant Examiner.*